US007623992B2

(12) United States Patent
Balmelli et al.

(10) Patent No.: US 7,623,992 B2
(45) Date of Patent: Nov. 24, 2009

(54) VOLUME WARPING FOR ADAPTIVE ISOSURFACE EXTRACTION

(75) Inventors: Laurent L. Balmelli, White Plains, NY (US); Fausto Bernardini, New York, NY (US); Christopher J. Morris, Mount Vernon, NY (US); Gabriel Taubin, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 863 days.

(21) Appl. No.: 10/408,813

(22) Filed: Mar. 28, 2003

(65) Prior Publication Data

US 2004/0193391 A1 Sep. 30, 2004

(51) Int. Cl.
*G06F 17/10* (2006.01)
*G06T 17/00* (2006.01)
(52) U.S. Cl. ............................ 703/2; 345/423; 345/424; 345/581
(58) Field of Classification Search ............... 703/2; 382/181–308; 345/419, 420, 423, 424, 581
See application file for complete search history.

(56) References Cited

U.S. PATENT DOCUMENTS 6,377,865 B1 * 4/2002 Edelsbrunner et al. ........ 700/98

OTHER PUBLICATIONS

"Space-Optimized Texture Maps," by Balmelli et al., published in Proceedings of Eurographics Sep. 2002.*
"Speeding Up Isosurface Extraction Using Interval Trees," by Cignoni et al., published by IEEE 1997.*
"Feature Sensitive Surface Extraction from Volume Data," by Kobbelt et al., published by ACM Press Aug. 2001.*
"Visualization-Specific Compression of Large Volume Data," by Bajaj et al., published by IEEE Oct. 2001.*
"Coloring Voxel-Based Objects for Virtual Endoscopy," by Shibolet et al., published by IEEE in 1998.*
"Improved Tissue Modelling and Fast Solver Methods for High Resolution FE-Modelling in EEG/MEG-Source Localization," Wolters et al., published by NEC in Aug. 2000.*
Alliez, Pierre et al. "Interactive Geometry Remeshing." 2002 ACM, pp. 347-354.*
Christensen, Gary E. et al. "Deformable Templates Using Large Deformation Kinematics." IEEE Transactions on Image Processing, vol. 5, No. 10, Oct. 1996, pp. 1435-1447.*

* cited by examiner

*Primary Examiner*—Russell Frejd
(74) *Attorney, Agent, or Firm*—Scully, Scott, Murphy & Presser, P.C.; Lisa M. Yamonaco, Esq.

(57) ABSTRACT

Methods and apparatus solving problems of polygonal approximations of isosurfaces extracted from uniformly sampled volumes increasing in size due to the availability of higher resolution imaging techniques. The large number of primitives represented hinders the interactive exploration of the dataset. Examples of methods are provided for adaptive isosurface extraction that are generally easy to implement and allows the user to decide the degree of adaptivity as well as the choice of isosurface extraction algorithm. The extraction of the isosurface is optimized by warping the volume. In a warped volume, areas of importance (e.g. containing significant details) are inflated while unimportant ones are contracted. Once the volume is warped, any extraction algorithm can be applied. The extracted mesh is subsequently unwarped such that the warped areas are rescaled to their initial proportions. The resulting isosurface is represented by a mesh that is more densely sampled in regions decided as important.

24 Claims, 13 Drawing Sheets

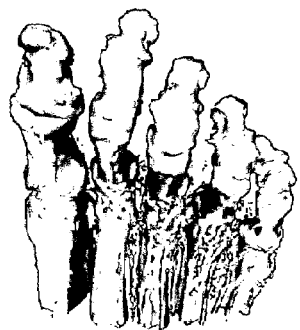
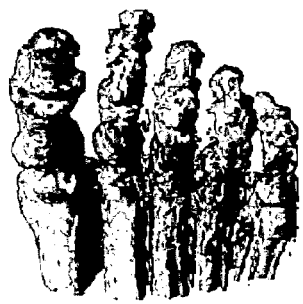
Fig. 3A   Fig. 3B
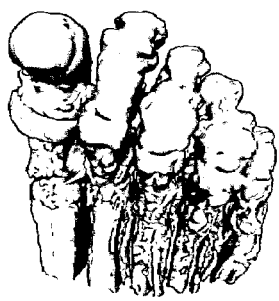
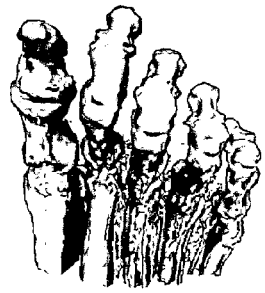
Fig. 3C   Fig. 3D
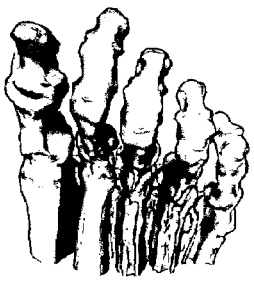
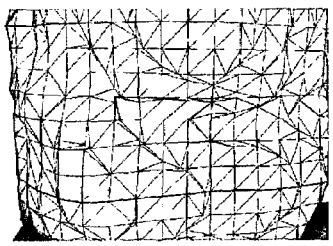
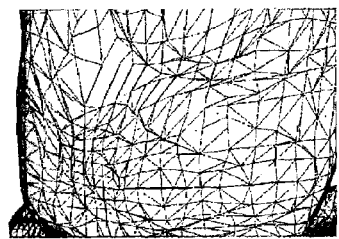
Fig. 3E   Fig. 3F   Fig. 3G

VOLUME WARPING FOR ADAPTIVE ISOSURFACE EXTRACTION

FIELD OF THE INVENTION

This invention is directed to adaptively extracting isosurfaces in a manner that allows a user a high degree of flexibility in determining the level of and areas of refinement. More particularly, the invention is directed to generating isosurfaces that have fewer polygonal components while still maintaining high levels of detail in areas designated as important by the user.

BACKGROUND OF THE INVENTION

With the advancement of data acquisition and storage techniques, volume datasets are steadily increasing in both size and resolution. As a result, we need efficient methods to visualize these datasets and cope with bandwidth and storage limitations. Researchers are investigating ways to adapt a common visualization technique, namely isosurface extraction, to the focus of the visualization.

Polygonal approximations of isosurfaces extracted from uniformly sampled volumes are increasing in size due to the availability of higher resolution imaging techniques. The large number of primitives represented hinders the interactive exploration of the dataset. Though many solutions have been proposed to this problem, many require the creation of isosurfaces at multiple resolutions or the use of additional data structures, often hierarchical, to represent the volume.

A typical strategy is to make the extraction adaptive to the local complexity of the isosurface in order to produce meshes that are fine in areas of interest and coarse in the remaining ones. This strategy differs from extracting vertices uniformly over the isosurface. In this way, the overall density of extracted vertices is significantly reduced while preserving the quality of the isosurface. The immediate benefit is the reduction of the cost in storage, transmission and rendering.

Many researchers have sought to extend common isosurface extraction methods, such as the well-known Lorenson's "Marching Cubes" algorithm, to produce adaptively tessellated isosurfaces. A prevalent idea, as is presented by Saupe in the article "Optimal memory constrained isosurface extraction", for the solution to this problem requires the use of algorithms and data structures that are often very specific to certain visualization scenarios and typically require large amounts of additional storage. Commonly, structures such as octrees and interval trees have been applied to address this problem. Furthermore, to facilitate the transition from finely sampled regions to coarser ones, multi-resolution hierarchies are used. These techniques provide results of quality, however, their costs in storage can be a limitation. Several techniques providing feature-driven extraction have been previously implemented, for example, by Wood in the article "Semi-regular Mesh Extraction From Volume," and Kobbelt in "Feature-Sensitive Surface Extraction From Volume Data." Some of these techniques use multi-resolution hierarchies in order to allow users to select areas to be refined adaptively.

SUMMARY OF THE INVENTION

The present invention provides solutions to the problem of adaptive isosurface extraction based on a volume warping method. The methods are easy to implement and allows a user to decide the degree of adaptivity as well as the choice of isosurface extraction algorithm. Extraction of the isosurface is optimized by warping the volume. In a warped volume, areas of importance (e.g. containing significant details) are inflated while unimportant ones are contracted. Once the volume is warped, any extraction algorithm can be applied. The extracted mesh is subsequently unwarped such that the warped areas are rescaled to their initial proportions. The resulting isosurface is represented by a mesh that is more densely sampled in regions decided as important.

Generally, the present invention solves the problem of adaptive isosurface extraction based on a volume warping method. This invention also describes methods, systems and apparatus for the generation of a refined isosurface within an original volume based upon an importance function.

Once a mesh is extracted from the warped volume, the vertex locations are unwarped in order to locally rescale the isosurface to its original proportions. The rescaled isosurface looks almost identical to the one extracted without warping the volume, with the difference being that the sampling of the mesh is finer in areas regarded as important.

The methods of the invention do not require the use of complex data structures, such as octrees and is relatively simple to implement. The presented methods allow a user to control the importance function such that the extraction is best suited to the goal of the visualization. The importance function can be computed automatically by analyzing the content of the volume, but can also be fully specified by a user.

An example method relies on the fact that a warped volume can be resized (i.e. downsampled) up to a certain extent without significant loss of details. Therefore a warped volume can be downsized without loss of details up to a critical size. Expectedly, this size depends directly on the characteristics of the dataset, i.e. on the amount of high-frequency details.

BRIEF DESCRIPTION OF THE DRAWINGS

These and other aspects, features, and advantages of the present invention will become apparent upon further consideration of the following detailed description of the invention when read in conjunction with the drawing figures, in which:

FIGS. 3a-3g show an example of a volume warping pipeline demonstrated with foot dataset;

DETAILED DESCRIPTION OF THE INVENTION

Figure 1A:
FIGS. 1a-1e show an example of a volume warping of bonsai dataset.
Figure 1B:
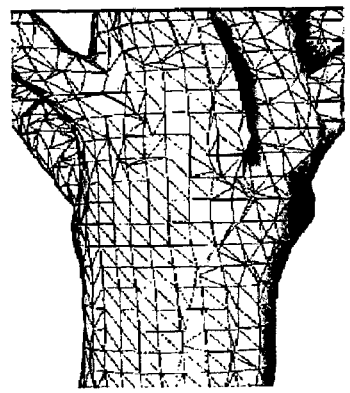
Figure 1C:
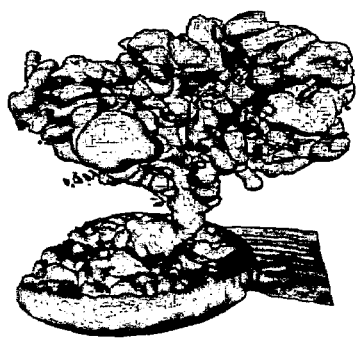

This invention describes methods, systems and apparatus for the generation of a refined isosurface within an original volume. In an embodiment, the present invention solves the problem of adaptive isosurface extraction based on a volume warping method. This invention also describes methods, systems and apparatus for the generation of a refined isosurface within an original volume based upon an importance function.

The methods are easy to implement and allows a user to decide the degree of adaptivity as well as the choice of isosurface extraction algorithm. It optimizes the extraction of the isosurface by warping the volume. In a warped volume, areas of importance (e.g. containing significant details) are inflated while unimportant ones are contracted. Once the volume is warped, any extraction algorithm can be applied. The extracted mesh is subsequently unwarped such that the warped areas are rescaled to their initial proportions. The resulting isosurface is represented by a mesh that is more densely sampled in regions decided as important.

Once a mesh is extracted from the warped volume, the vertex locations are unwarped in order to locally rescale the isosurface to its original proportions. The rescaled isosurface looks almost identical to the one extracted without warping the volume, with the difference being that the sampling of the mesh is finer in areas regarded as important. The extraction algorithm can be applied to a smaller (warped) version of the input volume in order to get a total vertex count identical to one that would be obtained with the extraction from an unoptimized volume. This method is therefore more economic in computational and storage requirements with the benefit of producing an adaptively sampled isosurface. The method requires warping the input volume. For this task, an efficient multigrid approach is used which allows operations to be performed efficiently.

Thus, the methods of the invention do not require the use of complex data structures, such as octrees and is relatively simple to implement. Furthermore, the presented methods allow a user to control the importance function such that the extraction is best suited to the goal of the visualization. The importance function can be computed automatically by analyzing the content of the volume, but can also be fully specified by a user. One method relies on the fact that a warped volume can be resized (i.e. downsampled) up to a certain extent without significant loss of details. A rapid analogy in signal processing is the downsampling of a discrete signal without aliasing. This is possible only if there is no frequency component (in the underlying continuous function) that is higher than half the resampling frequency (Shannon's sampling theorem.) Therefore a warped volume can be downsized without loss of details up to a critical size. Expectedly, this size depends directly on the characteristics of the dataset, i.e. on the amount of high-frequency details.

In an example embodiment, the invention describes a method to generate adaptively refined triangular meshes that are used to represent a surface of uniform intensity within a three-dimensional data set. This representative mesh is generally referred to as an isosurface and is a common visualization construct.

Figure 1E:
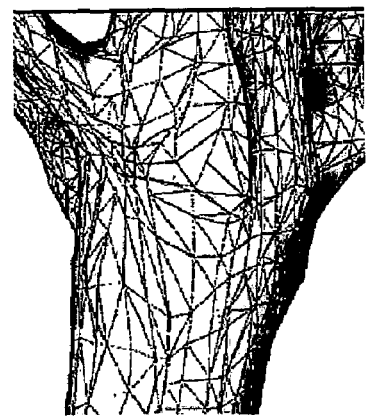
Figure 1D:

FIGS. 1a-1e show an example of a volume warping of bonsai dataset. Resulting refinement of isosurface mesh is compared to the original mesh as well. An unrefined isosurface (used here as a reference point) of the bonsai tree model is displayed in FIG. 1a. The triangular mesh in FIG. 1b that comprises this particular isosurface is uniform. Therefore, the same relative amount of triangles is used to denote both areas of high and low curvature. As a result, many triangles are used unnecessarily and the amount of triangles that make up the overall surface mesh is needlessly inefficient. As explained in the background of the invention, the proposed method includes generating an isosurface mesh by warping the volume, shown in FIG. 1c, and extracting an isosurface that is adaptively refined, shown in FIG. 1d, so that there is dense triangulation in areas of the volume that are deemed important and sparse triangulation in lesser important areas as shown in FIG. 1e.

Figure 2A:
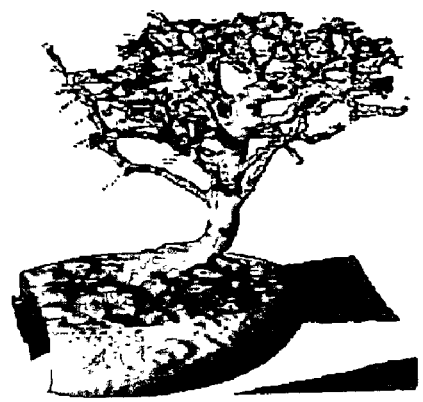
FIGS. 2a-2e show an example of a volume warping pipeline demonstrated with bonsai dataset.
Figure 2B:
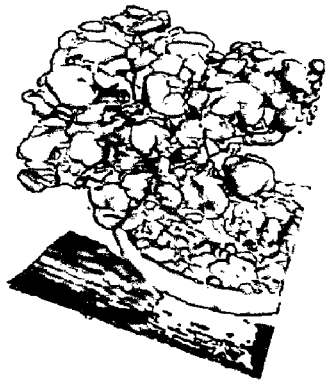
Figure 2C:
Figure 2D:
Figure 2E:

FIGS. 2a-2e show an example of a volume warping pipeline demonstrated with bonsai dataset. The automated importance function overlaid on the original isosurface mesh as well as refined meshes generated from subsampled warped volumes are presented. FIG. 2a shows an isosurface of the original bonsai tree volume with an importance function mapped onto the volume. FIG. 2b shows an isosurface of the bonsai volume that has been warped according to the importance function. FIG. 2c shows the resulting unwarped adaptively refined isosurface of the bonsai volume. FIG. 2d shows the isosurface extracted from the original volume. FIG. 2e shows the resulting adaptively refined isosurface of a warped volume that has been subsampled to 75% of the original resolution and size.

FIGS. 3a-3g show an example of a volume warping pipeline demonstrated with foot dataset. The automated importance function overlaid on the original isosurface mesh as well as the refined meshes generated from subsampled warped volumes are presented. Close-ups of the original and resulting isosurface meshes are displayed to show the adaptivity. FIG. 3a shows an isosurface of the original foot volume. FIG. 3b shows the isosurface with the importance function mapped onto the isosurface as in FIG. 2b. FIG. 3c shows the resulting isosurface of the warped volume. FIG. 3d shows the resulting refined isosurface while FIG. 3e shows the resulting refined isosurface extracted from a warped volume that is 90% of the original resolution and size. FIG. 3f shows the triangulation of the original unrefined isosurface mesh. FIG. 3g shows the triangulation of the adaptively refined isosurface mesh.

Figure 4:
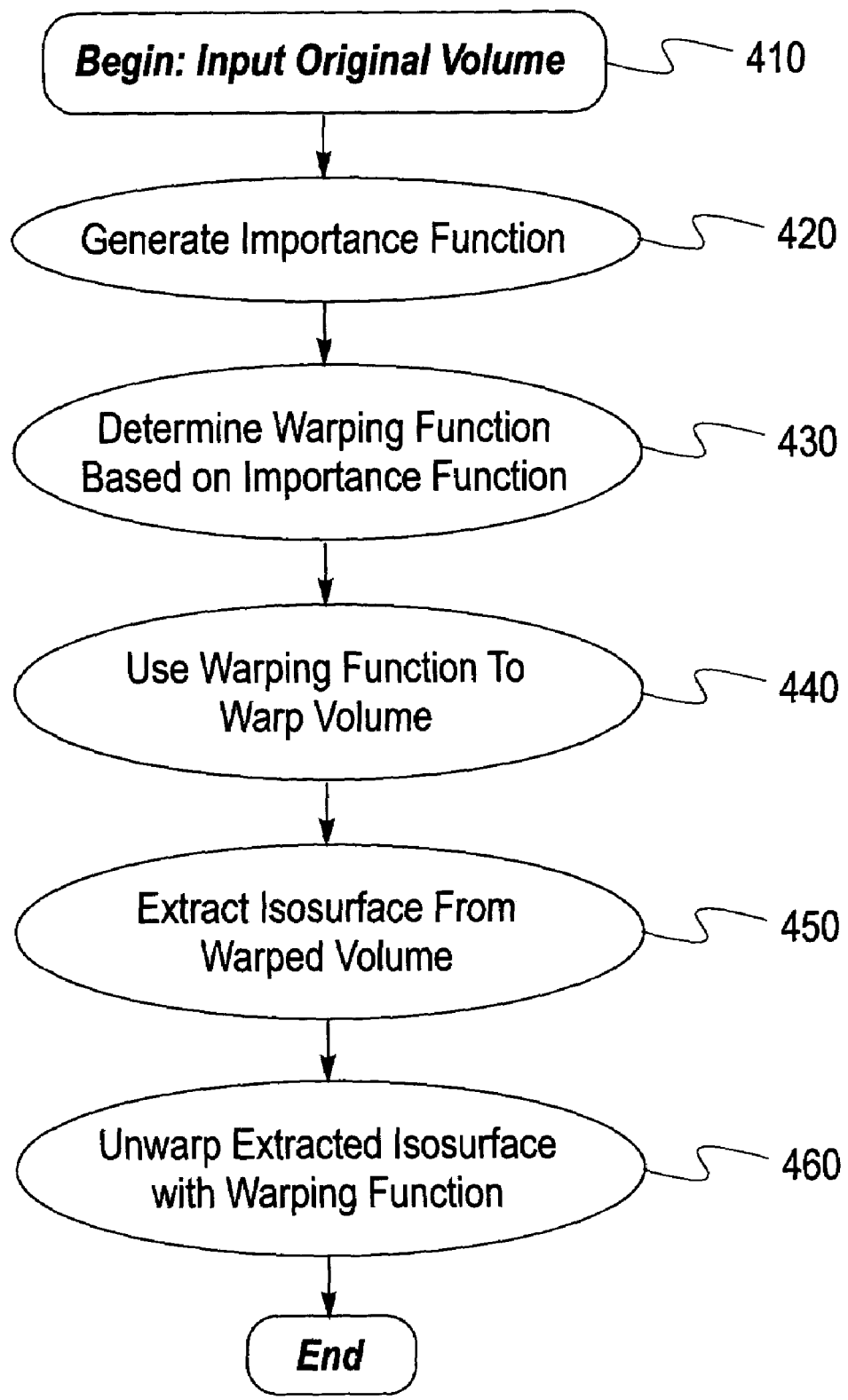
FIG. 4 shows an example of a Flow chart describing the volume warping pipeline.

FIG. 4 shows an example of a Flow chart describing the volume warping pipeline. It shows the input of the original volume 410, the calculation of the importance function 420, the determination of the warping function based on the importance function 430, the use of the warping function to warp the volume 440, the isosurface extracted from the warped volume 450, the unwarping of the extracted isosurface using the aforementioned warping function 460 at which point, the algorithm is complete 470.

Figure 5A:
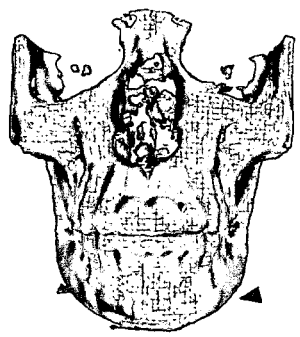
FIGS. 5a-5f show an example of a diagram of volume warping pipeline demonstrated with skull dataset and user-defined importance function designed to greatly expand the teeth region.
Figure 5B:
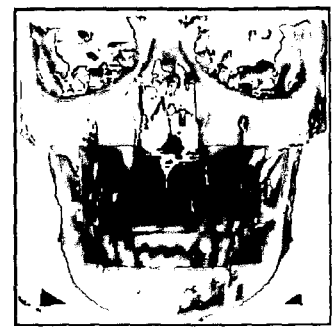
Figure 5C:
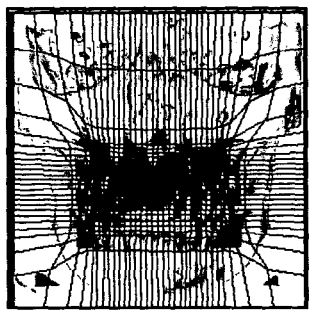
Figure 5D:
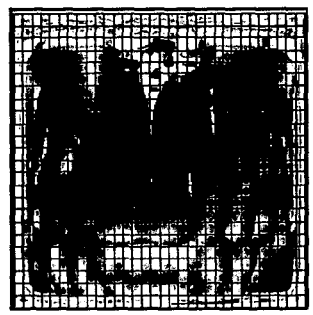
Figure 5E:
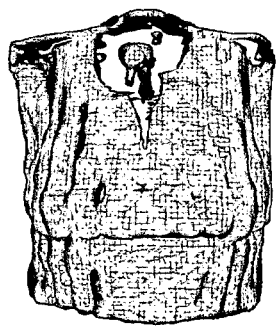
Figure 5F:
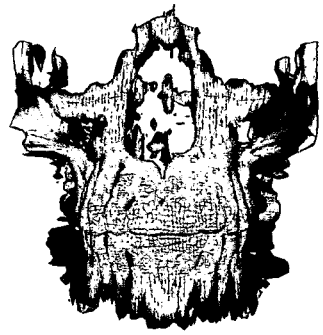

FIGS. 5a-5f show an example of a diagram of volume warping pipeline demonstrated with skull dataset and user-defined importance function designed to greatly expand the teeth region. A depiction of the relaxed grid process is displayed as well. FIG. 5a shows the isosurface of the original skull volume. FIG. 5b shows the original skull isosurface with the importance function mapped on the surface. Here, the mouth area has been designated as having the highest importance. FIG. 5c shows the relaxed tridimensional grid as the vertices converge on the important area. FIG. 5d shows the volume with the original tridimensional grid after it has been resampled; effectively warping the volume. FIG. 5e shows the resulting isosurface of the warped volume. FIG. 5f shows the final adaptively refined isosurface.

A method for determining areas of importance, warping the volume, and extracting the adaptively refined mesh is described in the following three steps and illustrated in FIGS. 2a-2e, FIGS. 3a-3g, and FIGS. 5a-5f, on a bonsai, foot, and skull volume; respectively:

Firstly, given the initial volume dataset an importance function (represented by a color map on an isosurface in FIGS. 2a, 3b, 5b, is measured. The importance function allows important regions inside the volume to be specified. Typically, important regions contain perceptually important details with in the volume.

Figure 6A:
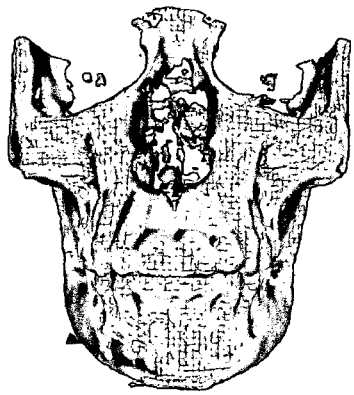
FIGS. 6a-6d show an example of a resulting isosurface meshes from the volume warping in the previous figure.
Figure 6B:
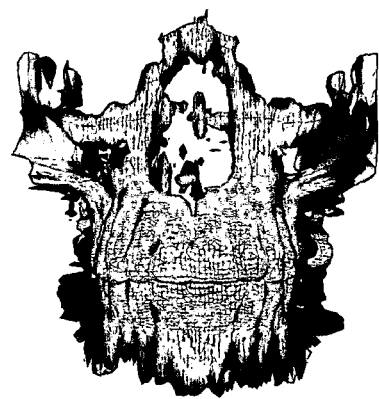
Figure 6C:
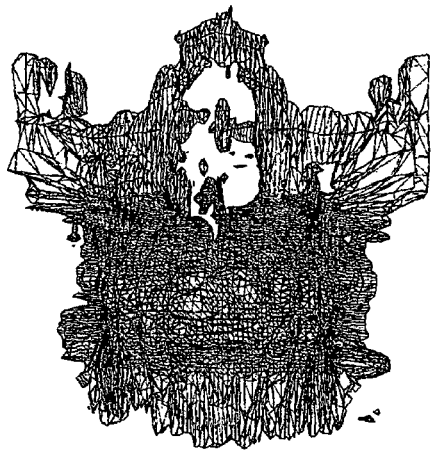
Figure 6D:

FIGS. 6a-6d show an example of a resulting isosurface meshes from the volume warping in the previous figure. Close-ups and alternative angles of the resulting mesh show the adaptivity of the mesh. FIG. 6a shows the unrefined isosurface extracted from the original skull volume. FIG. 6b shows the resulting isosurface that has been adaptively refined based on the importance function displayed in FIG. 5b. FIG. 6c is a close up of the isosurface in FIG. 6b showing the nonuniform refined triangulation in the isosurface mesh. FIG. 6d is a closer side view of the isosurface in FIGS. 6b and 6c.

Figure 7A:
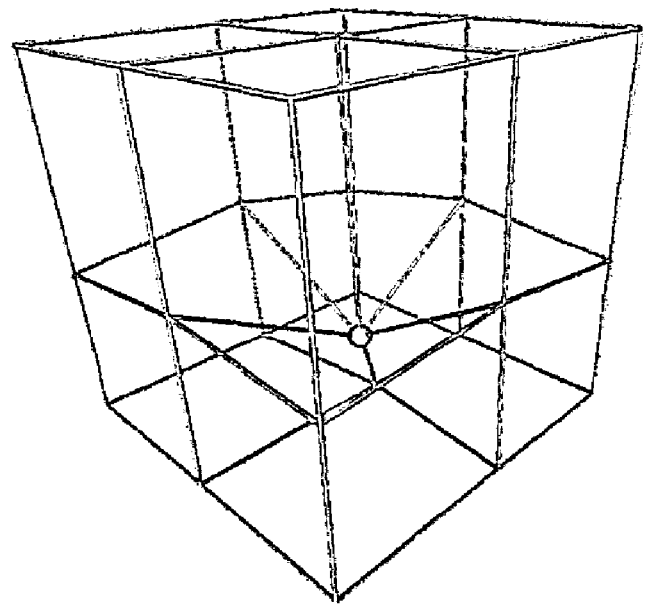
FIGS. 7a-7b show an example of a representation of the grid (and multigrid) used to model the warping function.
Figure 7B:
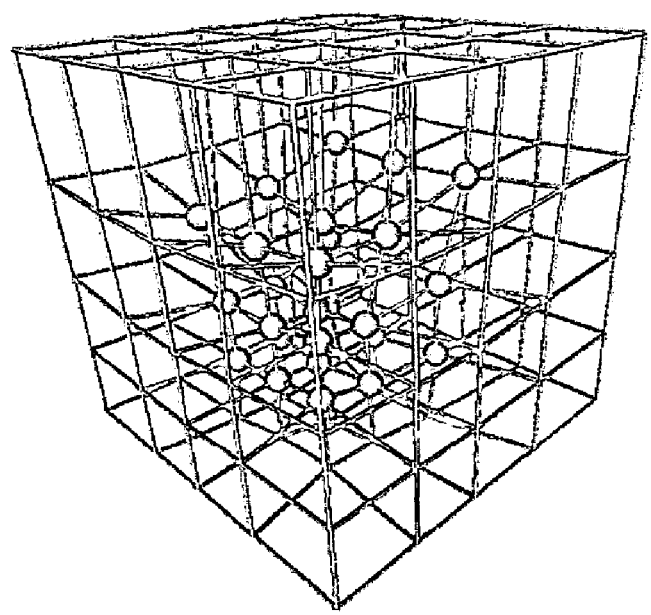

FIGS. 7a-7b show an example of a representation of the grid (and multigrid) used to model the warping function. FIG. 7a shows a representation of the vertices in a tridimensional grid converging to an area of importance (in this case, the center of the volume) as part of the grid relaxation process. FIG. 7b shows the same relaxation procedure applied in the multigrid approach.

Figure 8A:
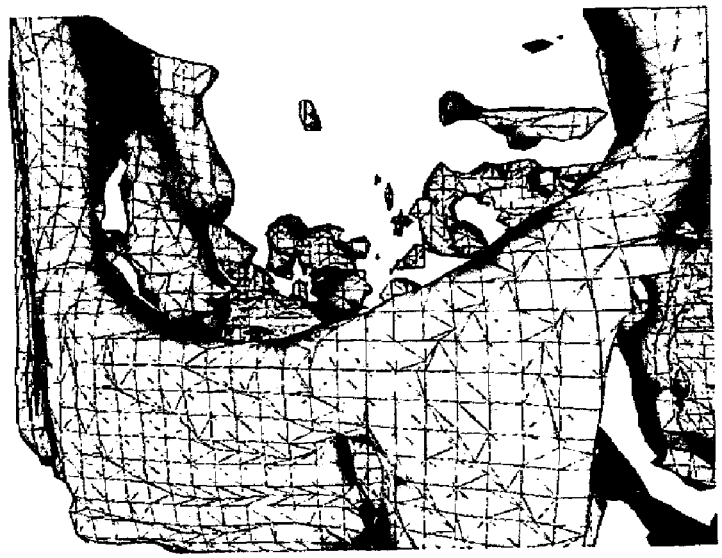
FIGS. 8a-8b show close-ups of skull dataset isosurface mesh before and after the volume warping process show the adaptivity of the mesh.
Figure 8B:
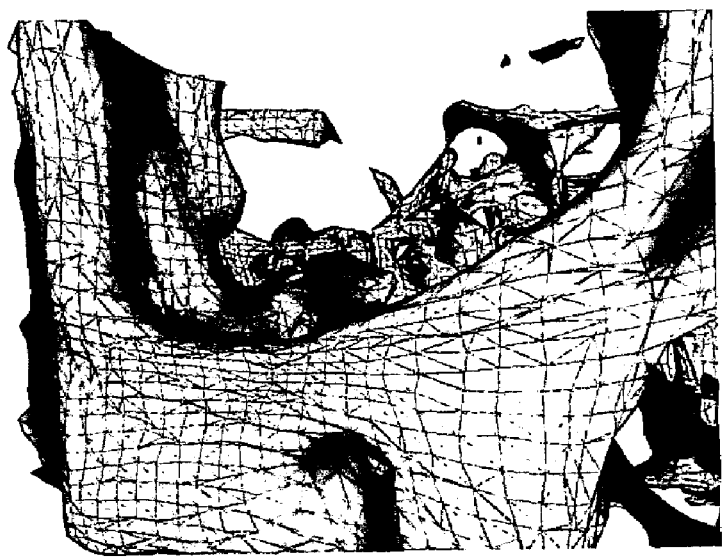

FIGS. 8a-8b show close-ups of skull dataset isosurface mesh before and after the volume warping process show the adaptivity of the mesh. FIG. 8a shows a close-up of the original unrefined isosurface mesh extracted from the skull volume. FIG. 8b shows a close-up of the adaptively refined isosurface mesh extracted from the warped skull volume and, subsequently, unwarped.

FIGS. 9a-9h show isosurface meshes of the original skull volume as the volume is increasingly subsampled. Also shown, are the adapted isosurface mesh undergoing the same subsampling process. Loss of detail and structure is significantly less in the adapted meshes. FIGS. 9a, 9c, 9e, and 9g show the unrefined isosurfaces extracted from the skull volume at 100%, 75%, 50%, and 25% resolution and size; respectively. FIGS. 9b, 9d, 9f, and 9h show the adaptively refined isosurfaces extracted from the warped skull volumes at 100%, 75%, 50%, and 25% resolution and size; respectively.

Figure 10:
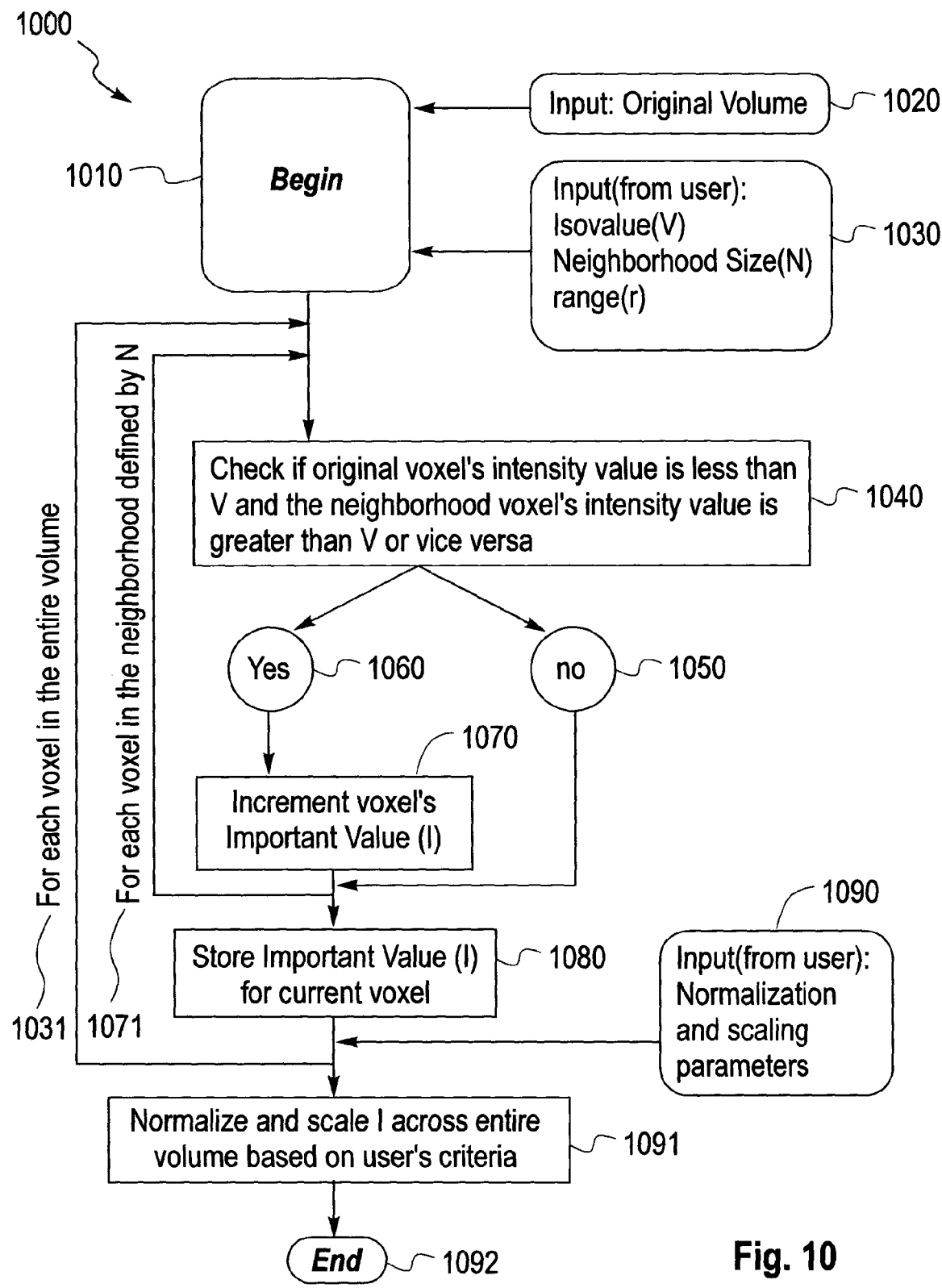
FIG. 10 shows an example of a flow chart of the automated importance function algorithm.

The importance function can be selectively determined by the user or generated automatically. FIG. 10 shows an example of a flow chart of the automated importance function algorithm. To begin 1010, for each voxel 1030 (a three-dimensional unit element) in the input volume 1020, each neighboring voxel is checked 1040 to see if a user-defined data intensity value (an isovalue) 1030 is crossed between the respective intensity values of it and the original voxel. If there is such a crossing, the importance value for the original voxel is incremented 1060. If there is not such a crossing 1050, the next voxel in the neighborhood radius defined by the user 1030 is queried 1071. This process is continued until all of the voxels within the neighborhood radius are processed. Once all the importance values for each voxel in the volume are determined 1080, they are normalized 1091 based on user-defined criteria 1090 and the algorithm is completed 1092. When all of the voxels in the volume have been processed, the With this process, areas with of high frequency (i.e. turbulent, non uniform regions) will typically receive a higher value in the importance function then areas of low frequency (i.e. smooth, uniform regions).

Secondly, a uniform three-dimensional grid of vertices whose coordinates lie inside the volume is relaxed in order to adaptively sample the importance function. Adaptation is obtained when vertices are distributed over the grid according to the importance function as displayed in FIGS. 7a-7b. Vertices converge to areas of importance in FIG. 7a. To improve convergence speed and accuracy, a multigrid approach can be used as well as in FIG. 7b. Ideally, more vertices are aggregated over important regions than over less important ones. The relaxed grid defines the warping function.

Thirdly, the warping function obtained in the previous step is used to resample the original volume. The input volumes (represented as an isosurface in FIGS. 1a, 3a, and 5a), and the corresponding warped volumes (represented as an isosurface in FIGS. 1c, 2a, 3c, and 5e), are shown. Once the isosurface is extracted from the warped volume, the resulting triangular mesh that comprises the surface can be "unwarped" using the original warping function. Thus, as seen in FIGS. 1, 3, 6, and 8, the final mesh is adaptively refined to regions defined as important by the importance function. This is noted by comparing FIGS. 1b and 1e, FIGS. 3f and 3g, FIGS. 6a and 6c, and FIGS. 8a and 8b. Areas that were greatly expanded in the warping process, shown in FIG. 5d, includes high triangulation where other less important areas, includes relatively few triangles as in FIGS. 5f, 6c, and 6d. As a result, there is a more efficient placement of triangles so that areas of high detail are still evident. Furthermore, the warped volume can be subsampled (see FIGS. 2e, 3d, and 3e) so that a more economical amount of triangles can be used to achieve the same level of detail represented by the isosurface mesh. In addition, as the volumes are increasingly subsampled, significantly more detail and structure is retained by the adapted mesh (see FIGS. 9a-9h).

The warping operation is performed using a discrete grid of vertices lying within the original volume. The accuracy of the grid is defined as the number of columns, the number of rows, and the number of slices throughout the volume. The user specifies the accuracy of the grid which, in turn, directly influences the accuracy of the warping procedure performed using the relaxed grid. During the relaxation process, the accuracy of the relaxed grid can be interactively modified.

The relaxed grid obtained at the end of the relaxation process is used to resample the original volume. The resampled volume is called the warped volume. The resampling process (see FIGS. 5a-5f) is performed using the relaxed grid as follows: For each voxel in the warped volume, a location in the original volume is queried using the relaxed grid, shown in FIG. 5c, (which lies in the domain of the original volume). The returned location is used to retrieve a scalar data intensity. The scalar data intensity is copied to the voxel's original location (determined from the original volume) in the warped volume, shown in FIG. 5d. When this process is completed an isosurface can be extracted from the warped volume, shown in FIG. 5e, using any isosurface extraction algorithm (i.e. Marching Cubes, Cuberille, etc.) that the user wishes. This isosurface is called a warped isosurface.

Figure 9A:
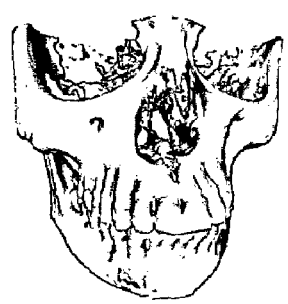
FIGS. 9a-9h show isosurface meshes of the original skull volume as the volume is increasingly subsampled, and the adapted isosurface mesh undergoing the same subsampling process.
Figure 9B:
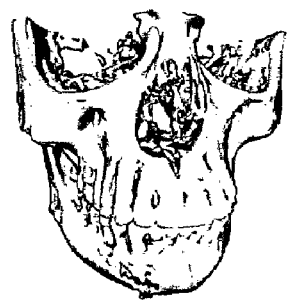
Figure 9C:
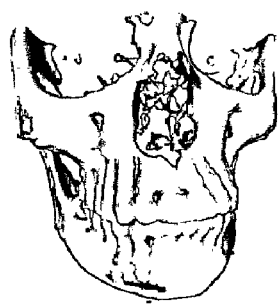
Figure 9D:
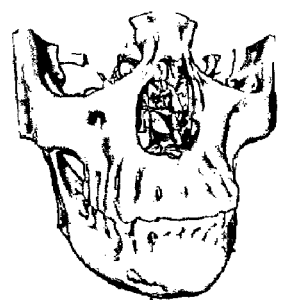
Figure 9E:
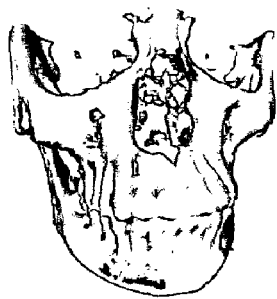
Figure 9F:
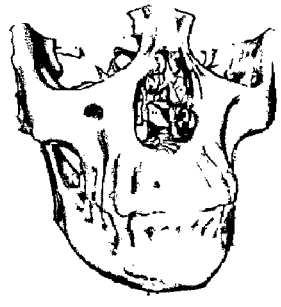
Figure 9G:
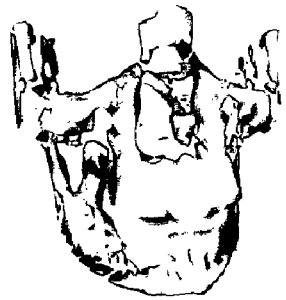
Figure 9H:
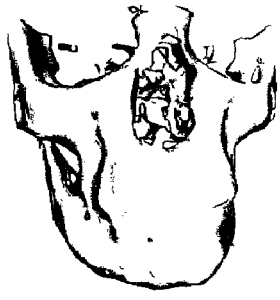

The resulting warped isosurface is unwarped using an inverse transformation in order to map its triangular vertices to the grid of the original volume as in FIG. 5f. FIG. 6b shows an example of adaptively refined isosurfaces. We compare the resulting meshes of an unrefined isosurface mesh, shown in FIG. 8*a*, and an adaptively refined isosurface mesh, shown in FIG. 8*b*. FIGS. 9*a* and 9*b* show an isosurface of the original volume and the warped volume (the isosurface was subsequently unwarped), respectively. FIGS. 9*c*, 9*e*, 9*g* show isosurfaces of increasingly subsampled volumes whereas FIGS. 9*d*, 9*f*, 9*h* show unwarped isosurfaces of volumes that were subsampled from the warped volume. The resulting subsampled volumes are reduced to 25%, 50%, 75% of the original size, respectively. Though the volumes have been reduced equally, the unwarped isosurfaces extracted from the warped volumes (FIGS. 9*b*, 9*d*, 9*f*, 9*h*) retain more of the detail of the original isosurface. In many cases, minimal loss of details and structure can be obtained with significantly less amounts of triangles. Thus, this method can improve the economy of storing or transmitting over the network these isosurface meshes and/or volumes.

This invention describes methods, systems and apparatus for the generation of a refined isosurface within an original volume based upon an importance function. In an embodiment, an example method includes the steps of obtaining an importance function of according some characteristics of the original volume. This importance function is used to warp a regular grid lying in the volume domain. The warping operation results in a relaxed grid. The relaxed grid is used to warp the original volume and yields a warped volume. Then a warped isosurface is extracted from the warped volume. Finally, the warped isosurface is unwarped to obtain a refined isosurface. In the refined isosurface the area of importance (designated by the importance volume) are more densely tessellated.

In an example embodiment the importance function is generated automatically using a given metric, for example provided by a user. A metric is implemented via an algorithm measuring the importance of a region. The metric is then used in the generation of the importance function. The importance function can also be fully designed by the user, in other words the importance function can be arbitrarily described in order to achieve specific, target visualization of the original volume. Finally, the importance function can be generated using any combination of the two methods described above.

Given an importance function, a regular grid is transformed into a relaxed grid though the use of a relaxation algorithm. Since the relaxation procedure is part of the common art, any relaxation algorithm can be used to obtain the relaxed grid. In an example of a method, a relaxation algorithm based on gradient descent is used. This is a well-know technique known to those familiar with the art.

Once a relaxed grid is obtained, the grid is used to warp the original volume into a warped volume. The warping process corresponds to resampling the original volume using the relaxed grid. For each discrete location in the original volume (thereafter "the original location"), a target location is computed using the relaxed grid. Then, the intensity value in the volume dataset at the target location is placed at the original location. The warped volume is obtained when each location in the original volume have been resampled using the relaxed grid, as described above.

An isosurface is extracted from the warped volume. The extraction of a warped isosurface is achieved using any isosurface extraction algorithm as known in the common art. The extraction of the warped isosurface results in a set of vertices and a set of polygons defined on these vertices. The set of vertices is unwarped using again the relaxed grid in order for the extracted surface to regain its original proportion, as in the original volume. The unwarping is achieved by computing a new, unwarped (by definition), location for each extracted vertex using the relaxed grid.

Alternative embodiments for the method of generating a refined isosurface within an original volume based upon an importance function include: generating the importance function; and/or a step of generating is performed in a mode consisting of an interactive mode, an automatic mode, or any combination of these; and/or the step of employing includes driving a relaxation algorithm in forming the relaxed grid; and/or the relaxation algorithm is a vertex smoothing algorithm; and/or warping includes resampling data values of the original volume based on the relaxed grid; and/or extracting a warped isosurface is achieved using any isosurface extraction algorithm as known in the common art; and/or extracting a warped isosurface results in a set of vertices and a set of polygons defined on these vertices; and/or unwarping the warped isosurface is achieved using the relaxed grid; and/or unwarping the warped isosurface includes computing an unwarped location for each the vertex wherein the step of generating the importance function includes measuring a number of crossings for the isosurface in a neighborhood of voxels in the volumetric dataset; and/or a step of measuring the number of crossings includes searching isosurface crossings in a user-defined geometric neighborhood of a voxel; and/or relaxing a uniform grid to form a relaxed grid according to the importance function such that grid vertices within regions of higher importance are contracted and grid vertices within regions of lesser importance are expanded; and/or a step of resampling the original volumetric dataset comprises applying a transformation to each unit volumetric area using the relaxed grid to compute a new location in the input volume for each location of unit volume within the input volumetric dataset; and/or reducing the size of the resampled volumetric dataset; and/or a step of extracting an isosurface from the resampled volumetric dataset includes using an extraction algorithm; and/or reducing a size of the volumetric dataset such that such that the extracted isosurface has minimal loss of information.

Figure 11:
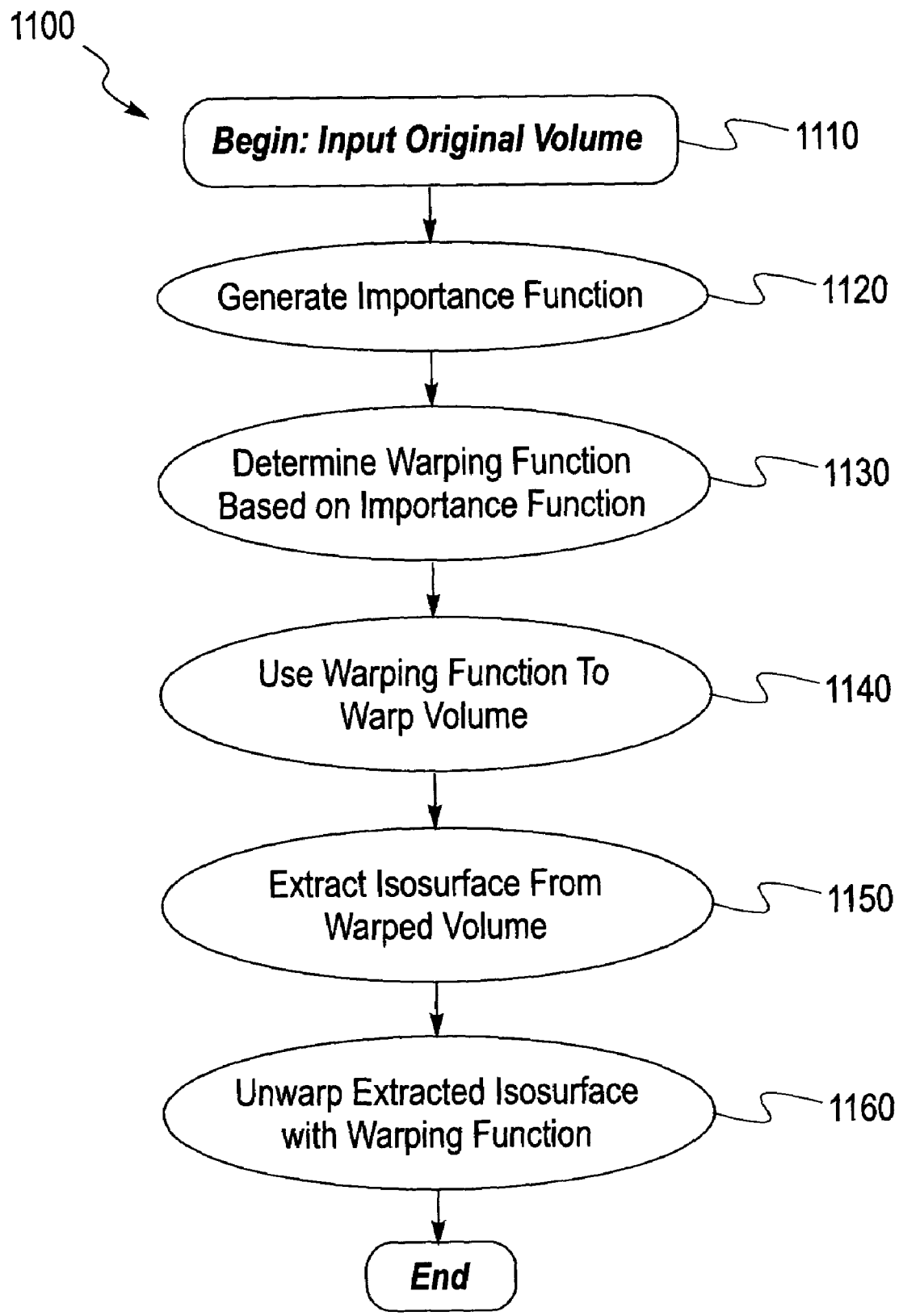
FIG. 11 shows an alternate embodiment of a method of the present invention for generating a refined isosurface within an original volume based upon an importance function.

An alternate embodiment of a method of the present invention for generating a refined isosurface within an original volume based upon an importance function is shown in FIG. 11. The method comprises the steps of: inputting the original volume 1110; calculating an importance function for the original volume 1120; determine a warping function based on the importance function 1130; using the warping function to warp the original volume 1140; extracting an extracted isosurface from the warped volume 1150; and unwarping the extracted isosurface with the warping function 1160.

Figure 12:
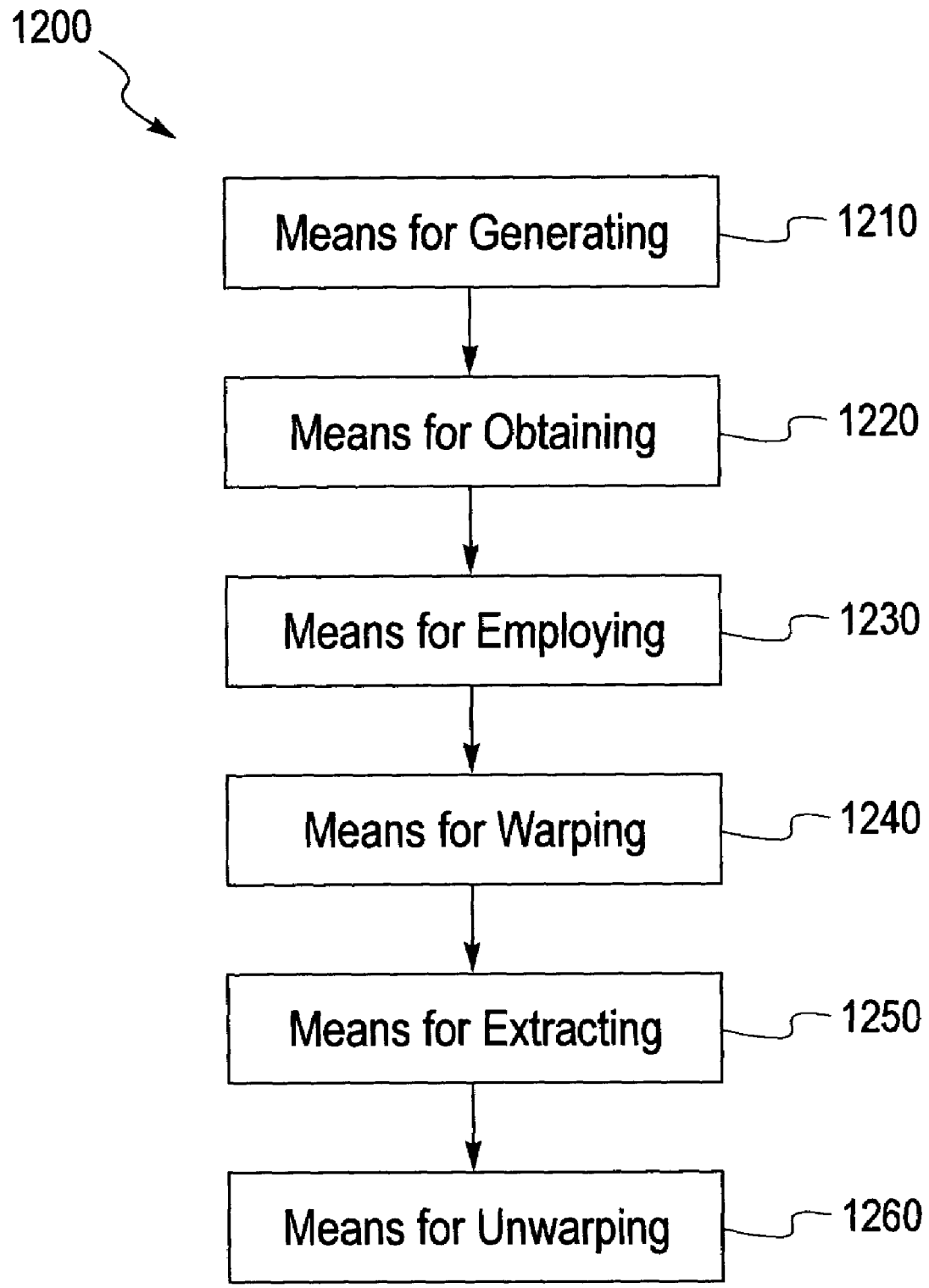
FIG. 12 shows an alternate embodiment of an apparatus for the present invention for generating a refined isosurface within an original volume based upon an importance function.

In an alternate embodiment, shown in FIG. 12, the invention is implemented as an apparatus 1200 comprising means for generating 1210 a refined isosurface within an original volume based upon an importance function. The means for generating 1210 a refined isosurface including: means for obtaining 1220 an importance function of the original volume; means for employing 1230 the importance function in warping a regular grid modeling the original volume to form a relaxed grid; means for warping 1240 the original volume based on the relaxed grid to obtain a warped volume; means for extracting 1250 a warped isosurface from the warped volume; and means for unwarping 1260 the warped isosurface to obtain the refined isosurface.

In some embodiments of the apparatus: the means for obtaining includes means for generating the importance function; and/or the means for employing includes means for driving a relaxation algorithm in forming the relaxed grid;

and/or the means for warping includes means for resampling data values of the original volume based on the relaxed grid.

Figure 13:
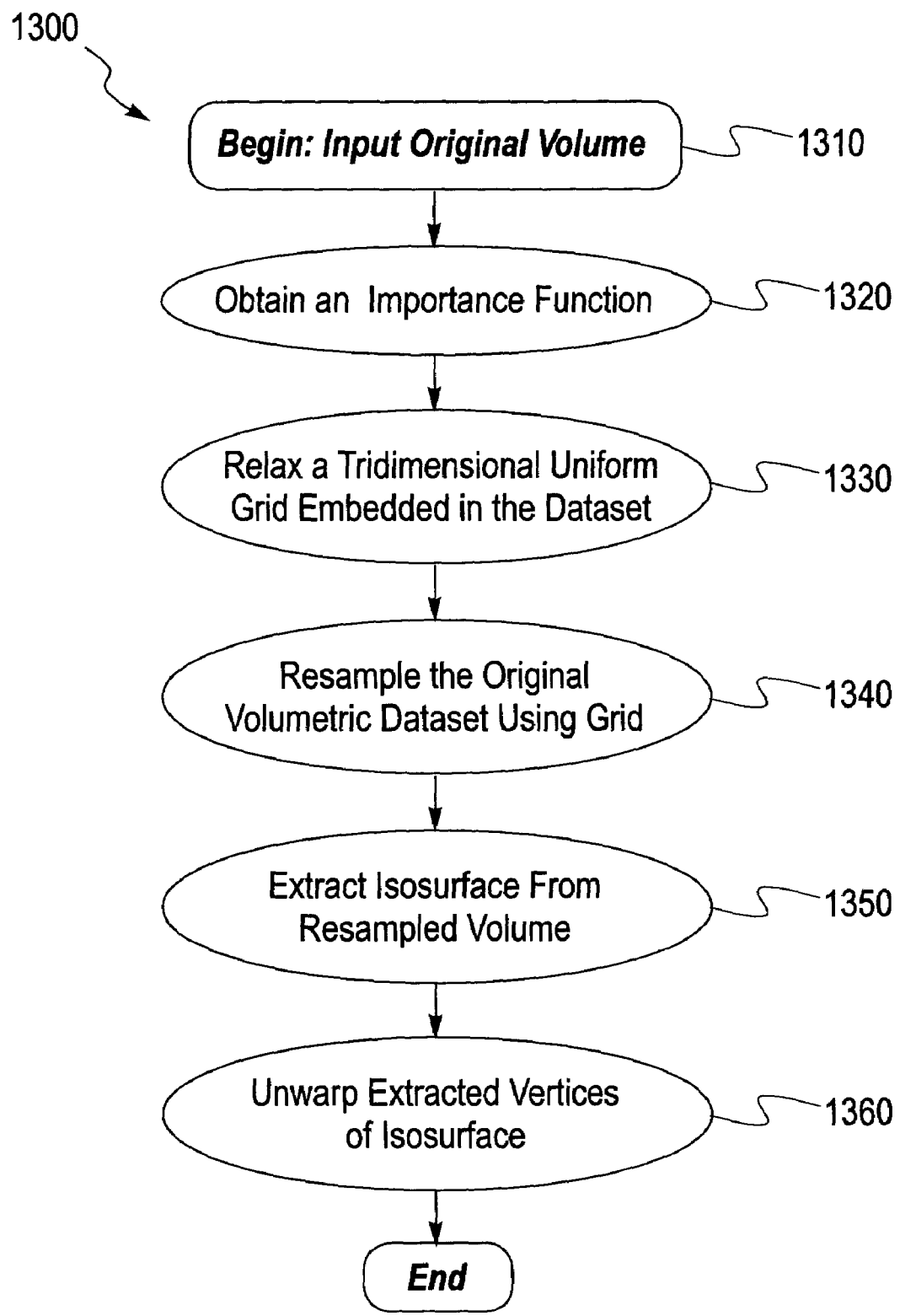
FIG. 13 shows an alternate embodiment of a method of the present invention for generating a refined isosurface within an original volume based upon an importance function.

An alternate embodiment of a method of the present invention for generating a refined isosurface within an original volume based upon an importance function is shown in FIG. 13. The method comprises the steps of: inputting the original volume 1310; calculating an importance function for the original volume 1320; relaxing a uniform tridimensional grid embedded in the dataset 1330; resampling the original volumetric dataset using the grid 1340; extracting an isosurface from the resampled volume 1350; and unwarping the extracted vertices of the isosurface 1360.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention. Still furthermore, the present invention may be implemented as an apparatus to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A method of generating a refined isosurface within an original volume based upon an importance function, comprising the steps of:

forming an initial, regular grid within said original volume, said regular grid comprised of a multitude of uniformly spaced apart vertices;

obtaining an importance function of said original volume, said importance function identifying areas of high importance and areas of low importance on said original volume;

applying said importance function to said initial, regular grid to warp said regular grid modeling said original volume to form a relaxed grid having a higher Tessellation density in the areas of high importance on said original volume and having a lower Tessellation density in the areas of low importance on said original volume, said relaxed grid defining a warping function;

using said warping function to return said relaxed grid to a regular grid shape within said original volume thereby warping the original volume based on said relaxed grid to obtain a warped volume;

extracting a warped isosurface from said warped volume;

unwarping said warped isosurface using the said relaxed grid to obtain said refined isosurface; and using said refined isosurface to form a dataset to visualize said original volume.

2. A method as recited in claim 1, wherein the step of obtaining includes generating said importance function.

3. A method as recited in claim 2, wherein the step of generating is performed in a mode consisting of an interactive mode, an automatic mode, or any combination of these.

4. A method as recited in claim 1, wherein the step of applying includes deriving a relaxation algorithm in forming said relaxed grid.

5. A method as recited in claim 4, wherein said relaxation algorithm is a vertex smoothing algorithm.

6. A method as recited in claim 1, wherein the step of using said warping function includes resampling data values of said original volume based on said relaxed grid.

7. A method as recited in claim 1, wherein the step of extracting a warped isosurface is achieved using an isosurface extraction algorithm.

8. A method as recited in claim 7, wherein the step of extracting a warped isosurface results in a set of vertices and a set of polygons defined on these vertices.

9. An article of manufacture comprising a computer usable medium having computer readable program code means embodied therein for causing generation of a refined isosurface, and comprising computer readable program code means for causing a computer to effect the steps of claim 1.

10. A program storage device readable by machine, tangibly embodying a program of instructions executable by the machine to perform method steps for generating a refined isosurface, said method steps comprising the steps of claim 1.

11. A method according to claim 1, wherein
the original volume has defined areas having given initial proportions,
the step of using said warping function includes the step of warping said defined areas; and
the step of unwarping said warped isosurfaces includes the step of rescaling said warped areas to said given initial proportions.

12. A method of generating a refined isosurface within an original volume based upon an importance function, comprising the steps of:
inputting the original volume;
forming an initial, regular grid within said original volume, said regular grid comprised of a multitude of uniformly spaced apart vertices;
calculating an importance function for the original volume, said importance function identifying areas of high importance and areas of low importance on said original volume;
using the importance function to warp the original volume, including the steps of:
using the importance function to warp said regular grid to form a relaxed grid having a higher Tessellation density in the areas of high importance on said original volume and having a lower Tessellation density in the areas of low importance on said original volume, said relaxed grid defining a warping function, and
using said warping function to return said relaxed grid to a regular grid shape within said original volume to obtain a warped volume;
extracting an isosurface from the warped volume;
unwarping the extracted isosurface with the warping function to obtain a refined isosurface;
and using said refined isosurface to help form a dataset to visualize said original volume.

13. An article of manufacture comprising a computer usable medium having computer readable program code means embodied therein for causing generation of a refined isosurface within an original volume based upon an importance function, the computer readable program code means in said article of manufacture comprising computer readable program code means for causing a computer to effect the steps of claim 12.

14. A method of equalizing a quantity of information for each unit volume within an original volumetric dataset used to visualize an original volume, including the steps of:
embedding a initial tridimensional uniform grid in the original volumetric dataset;
obtaining an importance function, wherein the importance function delineates volumetric regions of higher importance and regions of lower importance in the original volumetric dataset;
applying said importance function to the initial tridimensional uniform grid embedded in the original volumetric dataset to relax said tridimensional grid such that grid vertices of said tridimensional grid have a higher concentration in regions of higher importance and a lower concentration in regions of lower importance, and forming a relaxed tridimensional grid;
returning said relaxed grid to a regular grid shape within said original volume thereby resampling the original volumetric dataset using the relaxed tridimensional grid and forming a resampled volumetric dataset;
extracting an isosurface from the resampled volumetric dataset forming an extracted isosurface including extracted vertices;
unwarping said extracted vertices of the extracted isosurface using the relaxed grid to form a resampled volumetric dataset to visualize said original volume; and
reducing the size of the resampled volumetric dataset.

15. The method of claim 14, wherein the step of obtaining includes generating the importance function.

16. The method of claim 15, wherein the step of generating the importance function includes measuring a number of crossings for the isosurface in a neighborhood of voxels in the volumetric dataset.

17. The method of claim 16, wherein the step of measuring the number of crossings includes: searching isosurface crossings in a user-defined geometric neighborhood of a voxel.

18. The method of claim 17, further comprising relaxing a uniform grid to form a relaxed grid according to the importance function such that grid vertices within regions of higher importance are contracted and grid vertices within regions of lesser importance are expanded.

19. The method of claim 18, wherein the step of resampling the original volumetric dataset comprises applying a transformation to each unit volumetric area using the relaxed grid to compute a new location in the input volume for each location of unit volume within the input volumetric dataset.

20. The method of claim 14, wherein the step of extracting an isosurface from the resampled volumetric dataset includes using an extraction algorithm.

21. The method of claim 14, further comprising unwarping the extracted isosurface.

22. The method as recited in claim 14, further comprising reducing a size of the volumetric dataset such that the extracted isosurface has minimal loss of information.

23. An article of manufacture comprising a computer usable medium having computer readable program code means embodied therein for causing equalization of a quantity of information for each unit volume within an original volumetric dataset, the computer readable program code means in said article of manufacture comprising computer readable program code means for causing a computer to effect the steps of claim 14.

24. A program storage device readable by machine, tangibly embodying a program of instructions executable by the machine to perform method steps for equalizing a quantity of information for each unit volume within an original volumetric dataset, said method steps comprising the steps of claim 14.

* * * * *

UNITED STATES PATENT AND TRADEMARK OFFICE
CERTIFICATE OF CORRECTION

PATENT NO. : 7,623,992 B2  Page 1 of 1
APPLICATION NO. : 10/408813
DATED : November 24, 2009
INVENTOR(S) : Balmelli et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1172 days.

Signed and Sealed this

Twenty-sixth Day of October, 2010

David J. Kappos
*Director of the United States Patent and Trademark Office*